United States Patent
Markowski et al.

(10) Patent No.: US 9,232,179 B2
(45) Date of Patent: Jan. 5, 2016

(54) PORTABLE VIDEO-TELECOMMUNICATION DEVICE, DATA TRANSMISSION METHOD, IN PARTICULAR AUDIO/VIDEO DATA, AND OTHER APPLICATION

(75) Inventors: Jacek Markowski, Wołomin (PL); Michal Gulewicz, Warsaw (PL); Leszek Pełszyk, Wołomin (PL)

(73) Assignee: ZUZA PICTURES SP. ZO.O, Warsaw (PL)

( * ) Notice: Subject to any disclaimer, the term of this patent is extended or adjusted under 35 U.S.C. 154(b) by 63 days.

(21) Appl. No.: 13/814,311

(22) PCT Filed: Aug. 5, 2011

(86) PCT No.: PCT/PL2011/000085
§ 371 (c)(1),
(2), (4) Date: Feb. 5, 2013

(87) PCT Pub. No.: WO2012/018271
PCT Pub. Date: Feb. 9, 2012

(65) Prior Publication Data
US 2013/0271554 A1    Oct. 17, 2013

(30) Foreign Application Priority Data
Aug. 5, 2010  (PL) .......................................... 392068

(51) Int. Cl.
*H04N 7/14*      (2006.01)
*H04N 21/218*    (2011.01)
(Continued)

(52) U.S. Cl.
CPC ......... *H04N 7/142* (2013.01); *H04N 21/21805* (2013.01); *H04N 21/4223* (2013.01); *H04N 21/42203* (2013.01); *H04N 21/43637* (2013.01)

(58) Field of Classification Search
CPC combination set(s) only.
See application file for complete search history.

(56) References Cited

U.S. PATENT DOCUMENTS

2004/0064510 A1 *  4/2004  Ooi et al. ...................... 709/205
2008/0112315 A1    5/2008  Hu et al.
(Continued)

FOREIGN PATENT DOCUMENTS

WO    2005022845 A1    3/2005

OTHER PUBLICATIONS

International Search Report dated Dec. 14, 2011 from the corresponding PCT/PL2011/000085.
(Continued)

*Primary Examiner* — Joseph J Nguyen
(74) *Attorney, Agent, or Firm* — Katten Muchin Rosenman LLP

(57) ABSTRACT

The subject of the application is a portable communication device having possibility of wired and wireless transmission of audio/video data, characterized in that it is composed of a camera (2) and at least one microphone (3), for the synchronous image capturing, and a speaker (4). These elements (2, 3, 4) are connected to the central unit (5) equipped with cache memory and a microprocessor directly or through the first communication interface (6) to connect to external devices. Moreover, the central unit is connected to a second communication interface (7) for transmission and receiving data through the telecommunication network; all of these items are powered by power source (8). The patent application concerns the method of data transmission which is done by using the device (1) and applications of the device (1), as well as the method.

15 Claims, 4 Drawing Sheets

(51) Int. Cl.
*H04N 21/422* (2011.01)
*H04N 21/4223* (2011.01)
*H04N 21/4363* (2011.01)

(56) References Cited

U.S. PATENT DOCUMENTS

| | | |
|---|---|---|
| 2009/0019176 A1 | 1/2009 | Debrosse |
| 2009/0148124 A1 | 6/2009 | Athsani et al. |
| 2009/0163185 A1 | 6/2009 | Lim et al. |
| 2009/0221240 A1* | 9/2009 | Zhang ............................. 455/68 |
| 2009/0279464 A1* | 11/2009 | Kakani et al. ................. 370/311 |
| 2010/0045569 A1* | 2/2010 | Estevez et al. ................. 345/3.1 |
| 2011/0066646 A1* | 3/2011 | Danado et al. ................. 707/770 |
| 2011/0072469 A1* | 3/2011 | Vare et al. ....................... 725/62 |
| 2011/0271281 A1* | 11/2011 | Mandryk ....................... 718/100 |
| 2013/0295954 A1* | 11/2013 | Hamalainen et al. ...... 455/456.1 |

OTHER PUBLICATIONS

Anonymous: "Samsung Galaxy S", Wikipedia, the free encyclopedia, Aug. 4, 2010, XP002663971, Retrieved from the Internet: URL: http://en.wikipedia.org/w/index.php?title=Samsung_Galaxy_S&oldid=377190660 [retrieved on Nov. 24, 2011] the whole document.

* cited by examiner

PORTABLE VIDEO-TELECOMMUNICATION DEVICE, DATA TRANSMISSION METHOD, IN PARTICULAR AUDIO/VIDEO DATA, AND OTHER APPLICATION

A portable video-telecommunication device, data transmission method, in particular audio/video data, and their application.

The subject of the invention is a portable video telecommunication device, data transmission method, in particular audio/video data, and their application.

Portable video telecommunication device having the possibility of a wired or wireless transmission of audio/video data, according to the invention is characterized in that it comprises of camera and at least one microphone for synchronous video capturing, and a speaker. These elements are connected to the central unit, equipped with cache memory and a microprocessor directly or via the first communication interface in order to establish connection to external devices. Moreover, CPU is connected to the second communication interface in order to transmit and receive data through the telecommunications network, whereby all the elements are supplied by the power supply unit.

The central unit is coupled to a permanent memory unit, especially flash type memory, and/or memory card interface.

The device includes a handle for mounting on the head, the ear, or the fastener allowing to mount it on arms or parts of clothing or headgear.

Second interface enables data transmission via wireless telephone network, WLAN or other wireless networks.

First interface includes at least one of the following elements of the Bluetooth module, Wifi connectivity module, a USB, mini USB or microUSB or ancillary connector, particularly the minijack.

Second communication interface has a wired or wireless connection to a manual data entry device.

The camera unit is a high-resolution camera, stereoscopic camera or stereoscopic high-resolution camera.

The camera is mounted to a head which allows horizontal, vertical and lateral movement.

The camera and/or microphone and/or speaker are separate devices connected to the portable video telecommunication device via first communication interface.

Portable video telecommunication device includes a geographic positioning unit module connected to a central unit directly or using the first communication interface.

Portable device includes a digital video transmitter connected to the central unit directly or via the first communication interface.

The portable video telecommunication device includes a video monitor connected directly or via the first communication interface enabling preview of the camera recording.

In another scope, the invention is data transmission method, in particular audio/video data, characterized in that it is using a telecommunication system with the possibility of wired or wireless data transmission, notably audio/video data, composed of at least one portable video telecommunication device, connected through a telecommunications network to at least one central device.

The central unit is connected to at least one terminal or at least one data flow transceiver or television signal transceiver, which is connected to at least one data stream receiver or television signal, wherein:

1) through a central device to transmit data between the portable video telecommunication device and at least one terminal and/or at least one device transmitting and receiving data stream and/or television signal;

2) data transmitted by the device contain apart from audio/video data, the device identification data, user identification data, and access data, particularly user name, password, mobile identification number (MIN), the number of International Mobile Subscriber identifier (IMSI) number, International Mobile Equipment identifier (IMEI), Secret Serial Number (SSN), telephone number, Medium Access Control (MAC) or globally unique identifier (GUID) or other identifier.

3) after receiving data from the video telecommunication device they are processed, sorted and shared by any given criteria in the central unit based on the identification data they contain. The data is served in the form of audio/video to terminals users or data stream transceivers users and/or television signal transceivers as the audio/video data coming from a specific video communication device and/or particular user;

4) terminal user selects a specific portable video telecommunication device and/or its user, and then starts connection to selected portable video telecommunication device directly or via a central device, or 5) data stream transceiver and/or television signal transceiver assigns received data to at least one data stream channel or television signal, then transmits the data stream, particularly television signal to at least one data stream receiver and/or television signal receiver, which allows its user to select the data stream and/or TV channel Preferably, the data also contain data identifying the geographical location of the portable video telecommunication device or its user obtained from the geographic positioning unit.

The central unit of the portable video telecommunication device is given continuous transmission from the second communication interface. Data contain information on the type and quality of the connection. Audio/video and identification data are compressed on the fly inside the main unit so that the total size of the data was adjusted to the type of and quality of network connection.

Audio/video data supplied by at least one portable video telecommunication device is stored in the central unit, then made available to the terminal users and/or data stream transceivers and/or TV users.

Data are received and arranged using identification data, followed by classifying the data according to criteria such as geographical location, contents, user groups or online communities.

The data is provided to at least one terminal user via web server or a program-client running on the terminal.

In the video telecommunication device central unit and/or in the central device, audio/video data are removed or modified on the fly using preset algorithms, which detect graphic markers or elements within data, then putting other audio/video data, in particular data of certain 2D or 3D objects, in specified place.

Another aspect of the invention are its following applications:

1) TV production using multiple cameras, particularly reality shows, talent shows, game shows, where user can choose a view from multiple cameras independently
2) production of television broadcasts, including sporting events, reportage and journalism, broadcast live performances
3) network computer games, including games in the field
4) online chats
5) protection of property and population.

The other aspect of the invention relates to the application of method of broadcasting data, according to the invention to:

1) TV production using multiple cameras, particularly reality shows, talent shows, game shows, where user can choose a view from multiple cameras independently
2) production of television broadcasts, including sporting events, reportage and journalism, broadcast live performances
3) network computer games, including games in the field
4) online chats
5) protection of property and population
6) advertising.

The invention is presented in the form of application examples, as follows.

Figure 1:
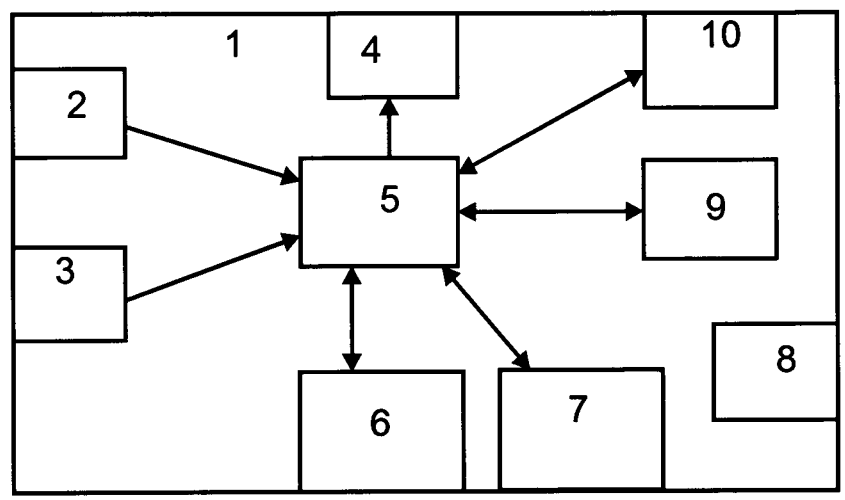
FIG. 1 illustrates a structural view of a portable video telecommunication device in a first embodiment of the presented invention.

FIG. 1 illustrates an example of portable video telecommunication device (1) addressing both wired and wireless transmission of audio/video, comprising of a camera (2) and at least one microphone (3), for the synchronous video capture and a speaker (4). Camera device (2) is a high-resolution camera, stereoscopic camera or stereoscopic high-resolution camera. These elements (2, 3, 4) are connected directly to the central unit (5) equipped with a cache memory and the microprocessor.

The device (1) has a first communication interface (6) as well in order to connect to external devices.

The first communication interface has at least one of the following: bluetooth module, wifi module, USB connector, mini USB connector microUSB or ancillary connector, particularly the minijack. The central unit is also connected to a second communication interface (7) in order to transmit and receive data through the network. The second communication interface (7) is used for communication with wireless phone network and/or WLAN network and/or other wireless data networks.

All the elements (2-7) of the device (1) mentioned above are powered by power source (8), such as a replaceable AAA batteries or rechargeable batteries. The device of the invention can also be equipped with control buttons for making or breaking connections.

Figure 2:
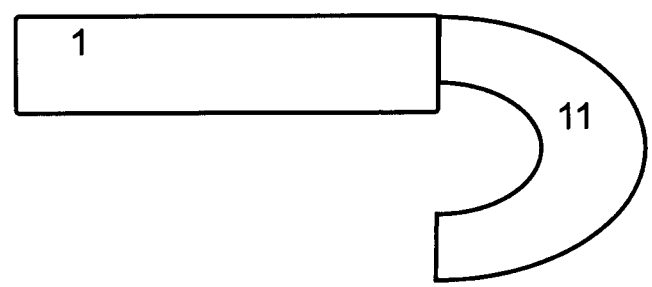
FIG. 2 illustrates a structural view of a portable video telecommunication device in a second embodiment of the presented invention.

Embodiment of the invention shown on FIG. 2 provides a device (1) equipped with a handle (11) for mounting on a user's ear. The device can be equipped (1) with a permanent or removable fastening mechanism (1) for mounting on a user's arms or head, the parts of clothing or headgear.

Figure 3:
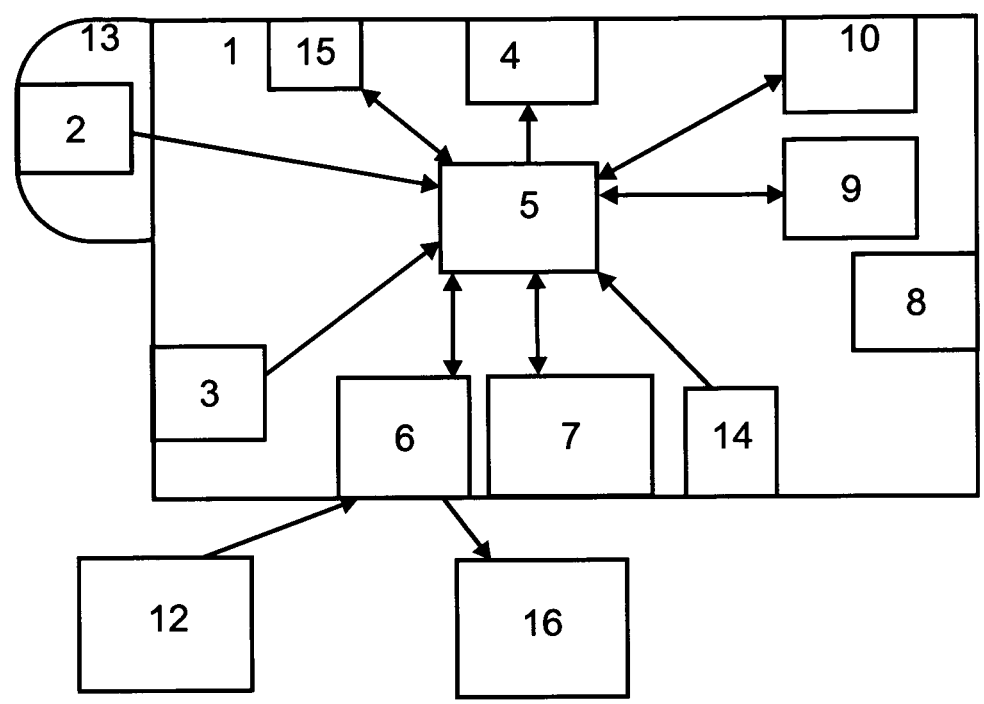
FIG. 3 illustrates a structural view of a portable video telecommunication device in a third embodiment of the presented invention.

FIG. 3 shows another embodiment of the invention where the microphone (3) is an external device and is connected to a central unit (5) through the first communication interface (6).

Furthermore, the camera (2) is mounted on the adjustable head (13) allowing it to rotate horizontally and/or vertically and/or in other directions. The central processing unit (5) is connected to the permanent memory (9), particularly flash memory and/or memory cards interface (10).

In addition, the first communication interface (6) is connected by wire or wireless to a device for manual data entry (12). The device (1) is equipped with a geographic positioning module coupled to the main controller unit (5) directly or through the first communication interface (6). The device includes a digital or analogue television signal transmitter (15) connected to a central processing unit (5) directly or through a first communication interface (6). The device (1) has also a monitor (16) connected to the central processing unit (5) through the first communication interface (6) enabling previewing image recorded by the camera (2).

Moreover, elements such as camera (2), microphone (3), speaker (4), for example in the form of headphones, may be separate devices connected by wire or wirelessly to the device (1) through the first communication interface (6). These devices can have their own power sources as well as elements for mounting on a user's arms or head, parts of clothing or headgear.

Figure 4:
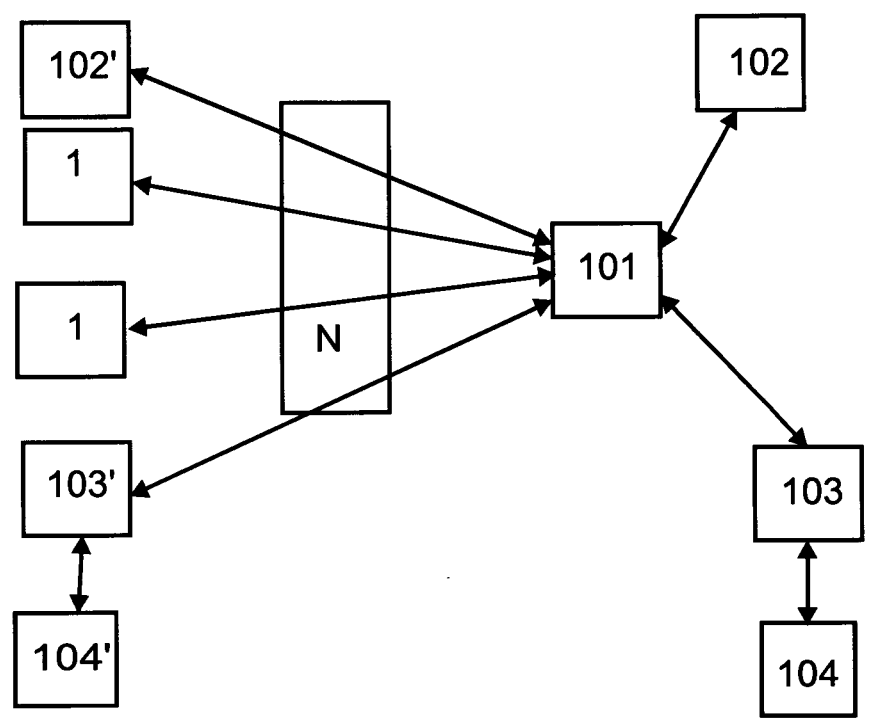
FIG. 4 illustrates a structural view embodiment of a transmission method according to the invention.
Figure 5:
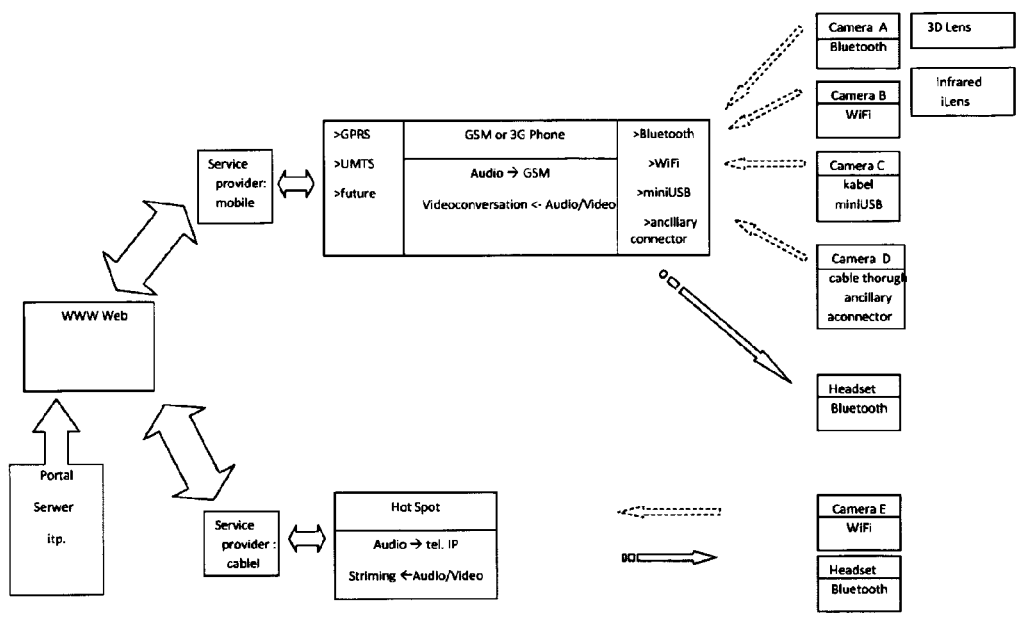
FIG. 5 illustrates a structural view of a broadcasting method of the invention and, FIG. 6 illustrates a structural view of a receiving process of the invention.
Figure 6:
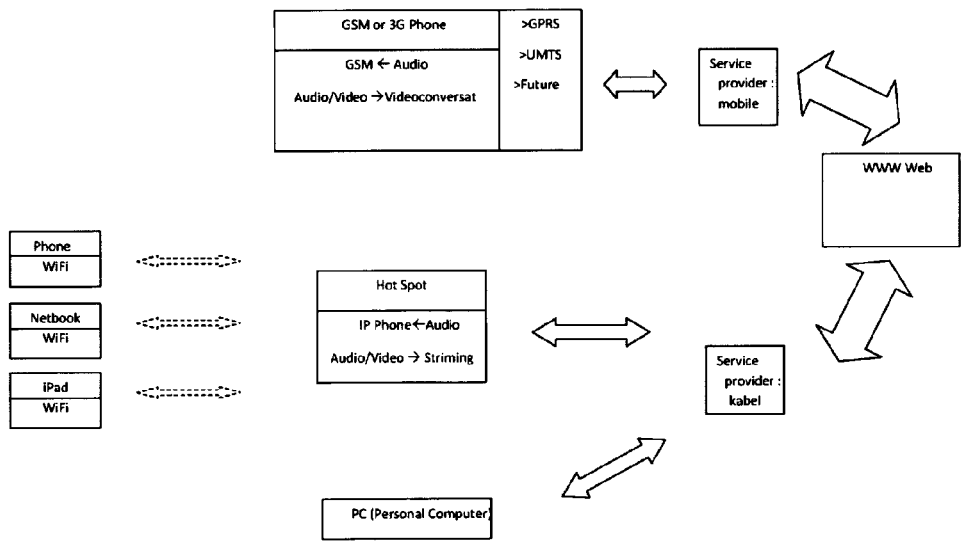

FIG. 4 illustrates a structural view of data transmission method, particularly audio/video data, in an embodiment of the present invention.

In this method the telecommunication system having possibility of wired or wireless data transmitting, notably audio/video data, has at least one portable telecommunication device (1), connected through a network (N), such as the Internet, to at least one central device (101). The central unit is connected to at least one terminal device (102, 102'), and at least one data stream or television signal transceiver device (103, 103'), connected to at least one data stream or television signal receiver(104, 104'). Within this structure:

1) through a central device (101) the data is transmitted between the video telecommunication device (1) and at least one terminal device (102, 102) and/or at least one data stream and/or television signal transmitting and receiving device (103, 103');
2) data transmitted by the video telecommunication device (1) include (in addition to audio/video data) device and/or user identification data, which allow to communicate with this device or its user, particularly user name, password, Mobile Identification Number (MIN), International Mobile Subscriber Identifier (IMSI) number, International Mobile Equipment Identifier (IMEI), Secret Serial Number (SSN), telephone number, Medium Access Control (MAC) or Globally Unique Identifier (GUID) or other identifier;
Identification data also contain geographical location of the video communication device (1) or user identification data coming from the geographic positioning module (14);
3) after receiving data from the video communication device (1) they are processed, sorted and shared by any given criteria in the central unit (101), based on the identification data they contain. The data are served in the form of audio/video to terminals users (102, 102') or data stream transceivers users and/or television signal transceivers (103, 103'), as the audio/video data coming from a specific video communication device (1) and/or its particular user;
4) the terminal user (102, 102) selects a specific video communication device (1) and/or its user, and then through the terminal (102, 102') connects to the selected video communication device (1) directly or through a central device (101), or
5) data stream or television signal transceiving and receiving device (103) assigns the received data to at least one specified channel data stream or television signal, then transmits the data stream (e.g. TV signal) to the receiver (at least one output data stream and/or television signal receiver) (104). The user makes the choice of the data stream and/or television channel;
6) The central unit (5) of the portable video telecommunication device (1) is given continuous transmission from the second communication interface. (7) Data contain information on the type and quality of the connection. Audio/video and identification data is compressed on the fly inside the main unit so that the total size of the data is adjusted to the type and quality of network connection (N).
7) the audio/video data transmitted by the at least one video telecommunication device (1) are recorded on data carriers (105) of the central device (101), and then made available to terminals users (102, 102') and/or users of data stream transceivers and/or television users (103, 103').
8) organizing the data transmitted by at least one video communication device (1), in particular the identity data, is performed by classifying the data according to criteria such as geographical location, the classification of the contents of the data, membership of the user of the device in thematic groups and/or community sites.
9) data are provided to at least one terminal (102, 102') user through the web server or program-client installed on the terminal (102, 102').
  1) In the central unit and/or in the central device, audio/video data are removed and/or modified on the fly using preset algorithms, which detect graphic markers or elements within data, then putting other audio/video data, in particular certain 2D or 3D objects, in specified place. Removing (and/or modifying) the data is to use algorithms which can recognize on the fly suitable markers or certain graphic elements in a transmitted audio/ video signal (e.g. faces, logos, places) and replace them with another image.
  Exemplary data replacing:
a) for graphic markers, usually considering the issue of adding a 3D element, which in the original image does not exist (for example, placing markers on the ground during the implementation of network game in the field and assign them to specific 3D elements that are visible to the player, or terminal user) (102);
b) specific graphic elements need to be replaced with another image. A good example is replacing the content of billboards (advertising large format). In fact, in a place such as washing powder ad, different content can be seen on the terminal screen, (e.g., inserted in such a way that the viewer is not aware of its construction).

The device described above (1) as well as data transmission method have many applications, e.g:
1) TV production using multiple cameras, particularly reality shows, talent shows, game shows, where user can choose a view from multiple cameras independently.
2) production of television broadcasts, including sporting events, reportage and journalism, broadcast live performances
3) network computer games, including games in the field
4) online chats
5) protection of property and population
6) advertising.

Mobile video communication device as well as certain data transmission method using the presented invention provides a number of possibilities such as:
2) audio/video transmission for 24 hours a day both in the TV and the Internet;
3) instead of virtual points and the statistics the player will receive information on the facts and exciting game for the true realization of purpose that he chooses;
4) a combination of Reality Show, a real street game and a virtual network game, where the player/viewer controls Reality Show participants, affects the scenario, and sometimes takes part in it;
5) combination of the advantages of three technologies: television, Internet and GSM;
6) the fact it gives players/viewers the opportunity to see through the eyes of another person and to influence their action at the same time, being a simple game of social networking providing access to social networking sites;
7) the player/viewer has the ability to independently accomplish TV live (CAM. SELECT).

The invention claimed is:

1. A video telecommunication system capable of a wired and a wireless transmission of audio and video data, comprising:
  a plurality of portable video telecommunication devices comprising:
    a movable camera and at least one microphone for synchronous video and sound capturing; and
    a speaker;
    wherein the movable camera, the microphone, and the speaker are connected to a central unit equipped with cache memory and a microprocessor via a first communication interface in order to establish connection to external devices,
    wherein the microprocessor is connected to a second communication interface in order to transmit and receive data through a telecommunications network, and
    wherein the movable camera, the microphone, the speaker, and the central unit are supplied power by a power supply unit, and
  at least one central server; and
  at least one terminal wirelessly coupled to a portable video telecommunication device through the central server through an interface,
  wherein a user of the terminal can remotely control movement of the movable camera to view the synchronous video and sound captured by the movable camera and the microphone of the portable video telecommunication device, and
  wherein the user of the terminal can select a single portable video telecommunication device for control from the plurality of portable video telecommunication devices using the interface,
  wherein the synchronous video and sound compressed on the fly by the central server based on the type and the quality of the connection between the portable video telecommunication device and the central server.

2. The video telecommunication system according to claim 1, wherein the central unit is connected to a permanent memory unit, and
  wherein the permanent memory unit is a flash type memory or a memory card interface.

3. The video telecommunication system according to claim 1, further comprising:
  a handle for mounting the plurality of portable video telecommunication devices on a hand or an ear; or
  a fastener for mounting the portable video telecommunication device to an arm, clothing, or headgear.

4. The video telecommunication system according to claim 1, wherein the second communication interface provides data transmission via a wireless telephone network or a wireless local area network.

5. The video telecommunication system according to claim 1, wherein the first communication interface includes at least a Bluetooth module, a WiFi unit, a universal serial bus (USB) connector, a microUSB connector, or a minijack connector.

6. The video telecommunication system according to claim 1, wherein the second communication interface has a wired or a wireless connection to a manual data entry device.

7. The video telecommunication system according to claim 1, wherein the movable camera is a stereoscopic high-resolution camera, and
wherein the user can view stereoscopic images captured by the camera on the terminal.

8. The video telecommunication system according to claim 1, wherein the movable camera is mounted to an adjustable head, allowing the camera to move, horizontally, vertically, or in other directions, and
wherein the user can user the interface to remotely control movement of the movable camera on the adjustable head using the interface.

9. The video telecommunication system according to claim 1, further comprising:
a geographic positioning unit module connected to the central unit through the first communication interface.

10. The video telecommunication system according to claim 1, further comprising:
a digital or analogue video transmitter connected to the central unit through the first communication interface.

11. The video telecommunication system according to claim 1, further comprising:
a video monitor connected to the central unit through the first communication interface,
wherein the video monitor enables preview of a recording from the movable camera.

12. A data transmission method comprising:
(a) transmitting a video signal and a data stream from a plurality of portable video telecommunication devices to a central server over a network,
wherein the video signal is captured by a microphone and a movable camera coupled to each of the portable video telecommunication devices,
wherein the data stream includes device identification data identifying the portable video telecommunication device, user identification data identifying a user of the portable video telecommunication device, and access data,
wherein the access data includes a user name, a password, and an identification number selected from the group comprising a mobile identification number (MIN), a number of International Mobile Subscriber Identifier (IMSI), an International Mobile Equipment Identifier (IMEI), a Secret Serial Number (SSN), a telephone number, a Medium Access Control (MAC), and a Globally Unique Identifier (GUID),
(b) after receiving the video signals and the data streams from the plurality of portable video telecommunication devices, the central server processes the access data to verify each portable video telecommunication device;
(c) selecting, using a terminal coupled to the central server, a specific portable video telecommunication device from the plurality of video telecommunication devices;
(d) viewing the video stream from the specific portable video telecommunication device on the terminal; and
(e) controlling, using the terminal, movement of the movable camera on the specific portable video telecommunication device using an interface,
wherein the video signal is compressed on the fly by the central server based on the type and the quality of the connection between the portable video telecommunication device and the central server.

13. The data transmission method according to claim 12, wherein the data stream contains a geographical location of the portable video telecommunication device obtained from a geographic positioning unit.

14. The data transmission method according to claim 12, wherein the video signal is stored on the central server and the terminal can access and view the stored video signal on the central server.

15. The data transmission method according to claim 12, wherein, in the central server modifies the video signal by detecting a graphic marker in the video signal and replaces the graphic marker with a replacement graphic in real time before transmitting the video signal to the terminal.

* * * * *